United States Patent [19]
Rakestraw et al.

[11] Patent Number: 5,696,419
[45] Date of Patent: Dec. 9, 1997

[54] HIGH-EFFICIENCY ELECTRIC POWER GENERATOR

[75] Inventors: Thomas G. Rakestraw; Alan E. Rakestraw, both of El Cajon, Calif.

[73] Assignee: Alternative Generation Devices, Inc., El Cajon, Calif.

[21] Appl. No.: 258,754

[22] Filed: Jun. 13, 1994

[51] Int. Cl.$^6$ .................................................. H02V 1/22
[52] U.S. Cl. .................. 310/268; 310/261; 310/290; 310/53; 310/155; 310/54; 310/171; 310/152; 310/254; 290/43; 290/44
[58] Field of Search ............................ 310/155, 268, 310/171, 152, 156, 261, 254; 290/43, 44, 53, 54

[56] References Cited

U.S. PATENT DOCUMENTS

| | | | |
|---|---|---|---|
| 4,074,157 | 2/1978 | Lace | 310/67 |
| 4,303,843 | 12/1981 | Arnoux et al. | 310/67 |
| 4,318,019 | 3/1982 | Teasley et al. | 310/156 |
| 4,475,075 | 10/1984 | Munn | 322/1 |
| 4,639,626 | 1/1987 | McGee | 310/155 |
| 4,798,986 | 1/1989 | Smith, Jr. | 310/268 |
| 4,866,321 | 9/1989 | Blanchard et al. | 310/112 |

*Primary Examiner*—Steven L. Stephan
*Assistant Examiner*—Elvin G. Enad
*Attorney, Agent, or Firm*—Lyon & Lyon LLP

[57] ABSTRACT

An electrical generator has a plurality of C-shaped stator members which are made of magnetically permeable material. Each C-shaped stator member includes a respective stator winding, and the stator members are positioned such that the ends of the members form first and second planar rings of equal diameter to establish a gap therebetween. A flat, ring-shaped rotor defines a periphery, and a plurality of permanent magnets are positioned around the periphery. The rotor is positioned with the magnets of the rotor disposed in the gap defined by the stator members. Consequently, when the rotor is rotated by a prime mover to move the magnets through the gap, an electrical current is induced in the stator windings.

24 Claims, 2 Drawing Sheets

HIGH-EFFICIENCY ELECTRIC POWER GENERATOR

FIELD OF THE INVENTION

The present invention relates generally to electrical generators, and more particularly to high-efficiency electrical generators having a large number of applications.

BACKGROUND

Many, if not most, existing electrical generators include a drum-shaped rotor mounted for rotational motion within a magnetic field which is generated by a surrounding stationary stator. The magnetic field ordinarily is generated by an electric current which flows through wires, commonly referred to as "field windings", that are positioned on the stator. Typically, one or more electrically conductive wires referred to as armature windings are wrapped around the rotor, and as the rotor is caused to rotate within the stator by a prime mover (e.g., a turbine-driven shaft), the relative motion of the armature windings within the magnetic field produces an electrical output current in the armature windings.

In such generators, electrical contacts are mounted on the rotor and complementary stationary contacts, often referred to as "brushes" or "slip rings", are mounted around the rotor. As the rotor turns, the electrical contacts of the rotor move past the brushes or slip rings, contacting the brushes/slip rings as they do so to thereby provide a circuit for electricity to traverse from the armature to a load that is external to the generator.

It will be appreciated that slip rings and brushes can become worn and abraded, and they accordingly require periodic maintenance and replacement. Furthermore, electrical sparking is often generated as the armature contacts move past the brushes, creating a safety hazard. Moreover, generator efficiency is degraded in such machines by the electrical resistance of the brushes and by mechanical friction loss from the drag of the brushes on the rotor. Additionally, the presence of the relatively heavy armature windings on the rotor makes the rotor more difficult to rotate than would otherwise be the case, further reducing the efficiency of the generator.

To address some of the drawbacks noted above with conventional generators, a device known as the inductor alternator has been introduced. In the inductor alternator, permanent magnets are mounted on the stator, and the armature windings are also located on the stator. Unfortunately, inductor alternators tend to be bulky and inefficient.

Other generators have attempted to address the problems associated with inductor alternators noted above by establishing the armature on the stator and mounting permanent magnets on a drum-shaped rotor, thereby removing the need for field windings. Unfortunately, however, voltage regulation in such generators is difficult, and the magnet mounts cannot easily withstand high rotational speeds. Also, owing to the number of small magnets which must be bound together on a large drum-shaped rotor which must in turn be precisely positioned within a stator, assembly of such devices is difficult at best.

One solution to the problems noted above has been disclosed in U.S. Pat. No. 4,639,626 to McGee. McGee proposes mounting both the armature and field-establishing permanent magnets on a stator having a C-shaped cross-section, and then rotating a rotor through the gap established by the C-shaped stator. As taught in McGee, the rotor has alternating regions of magnetically permeable and impermeable material disposed around the periphery of the rotor, to change the magnetic flux in the stator and thereby generate an electrical current. In contrast to the present invention, McGee specifically teaches away from mounting the permanent magnets on the rotor. As recognized by the present invention, however, permanent magnets can be mounted on a rotor to establish an efficient combination of structure for generating electricity.

Accordingly, it is an object of the present invention to provide an electrical generator which is efficient. Another object of the present invention is to provide an electrical generator which does not require rotating a bulky rotor or bulky armature windings. Still another object of the present invention is to provide an electrical generator which is easy to use and cost-effective to manufacture.

SUMMARY OF THE INVENTION

An electric power generator includes a stator made of a plurality of stator members, and the stator members are in turn made of material which is characterized by high magnetic permeability. In accordance with the present invention, each stator member is formed with a back side element that is wound with electrically conductive wire. Also, each stator member is formed with opposed top and bottom elements which are connected to the back side element and which extend perpendicularly away from the back side element to establish a gap between the top and bottom elements.

A wheel-shaped rotor defines a periphery and has at least one permanent magnet mounted thereon. As intended by the present invention, the rotor is rotatably mounted such that the magnet passes between successive gaps in the stator when the rotor is rotated with respect to the stator. Preferably, the rotor is thin, flat, and ring-shaped.

In one presently preferred embodiment, a plurality of permanent magnets are mounted in a circular pattern on the rotor. Additionally, each stator member is generally C-shaped, and each stator member is made of a plurality of thin, flat, C-shaped stator elements, with each stator element being held flush against its immediately adjacent stator elements.

To support the rotor, a plurality of bearings are juxtaposed with the rotor and bear against the rotor. Furthermore, a rotor driver is coupled to the rotor to cause the rotor to rotate. The rotor driver preferably includes at least one vane against which fluid can be directed to cause the rotor to rotate. As envisioned by the present invention, the vane can be a turbine blade, windmill vane, or vehicle-mounted vane for turning the rotor when wind is directed against the vane.

In one embodiment, the periphery of the rotor surrounds the back side elements of the stator members. In another embodiment, the periphery of the rotor is surrounded by the back side elements of the stator members.

In another aspect of the present invention, an apparatus for generating electricity includes a stator made of magnetically permeable material, and the stator defines an annular gap. An electrically conductive winding is positioned in electro-magnetic engagement with the stator. Additionally, a plurality of permanent magnets are disposed adjacent the winding for generating a magnetic field, and a shaftless rotatable rotor is movably disposed relative to the stator such that when the rotor is rotated relative to the stator an electric current is generated in the winding.

In yet another aspect of the present invention, a generator of electricity includes a magnetically permeable stator which forms first and second planar rings of equal diameter. The rings define a central axis, and the rings are generally parallel and axially spaced from each other to establish a gap therebetween. At least one stator winding is engaged with the stator. Moreover, a circularly-shaped rotor has alternating regions of magnetized and unmagnetized material. Importantly, the rotor is disposed for rotation about the central axis with the regions of magnetized and unmagnetized material disposed generally on the periphery of the rotor for movement within and through the gap to thereby induce an electrical current in the stator winding.

The details of the present invention, both as to its structure and operation, can best be understood with reference to the accompanying drawings, in which like reference numerals refer to like parts, and in which:

DETAILED DESCRIPTION OF THE PREFERRED EMBODIMENTS

Figure 1:
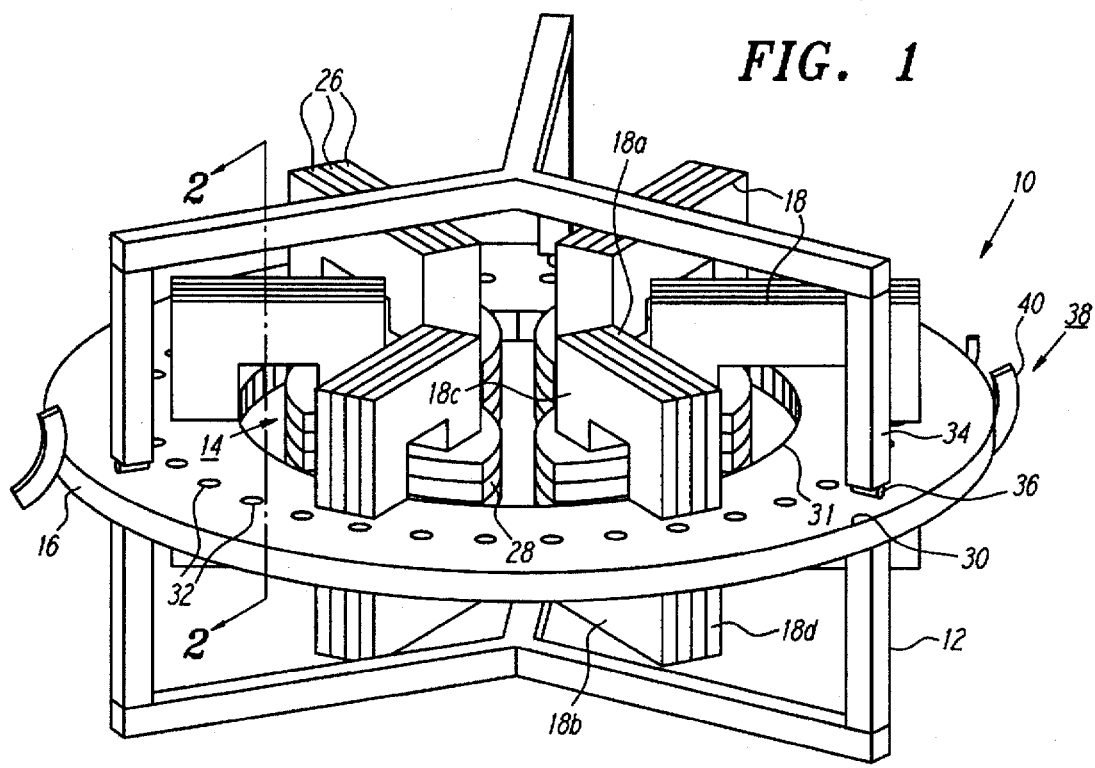
FIG. 1 is a perspective view of the generator of the present invention, with portions broken away for clarity and with the vanes shown schematically.

Referring initially to FIG. 1, an electric power generator is shown, generally designated 10. As shown, the generator 10 includes a base 12 and a stator, generally designated 14, stationarily mounted on the base 12. A shaftless rotor 16 is rotatably mounted on the base 12, and the rotor 16 can turn relative to the stator 14.

As shown in FIG. 1, the stator 14 includes a plurality of, preferably six (6), stator members 18. It is to be understood, however, that the stator 14 can include fewer or greater stator members 18. As shown, each stator member 18 is configured generally like a block-style letter "C". Accordingly, each stator member 18 has parallelepiped-shaped top and bottom elements 18a, 18b which are parallel with each other, a parallelepiped-shaped back side element 18c extending perpendicularly between the top and bottom elements 18a, 18b, and a front side element 18d having a gap 20 formed therein. Together, the individual gaps 20 of the stator members 18 define an annular gap.

Figure 2:
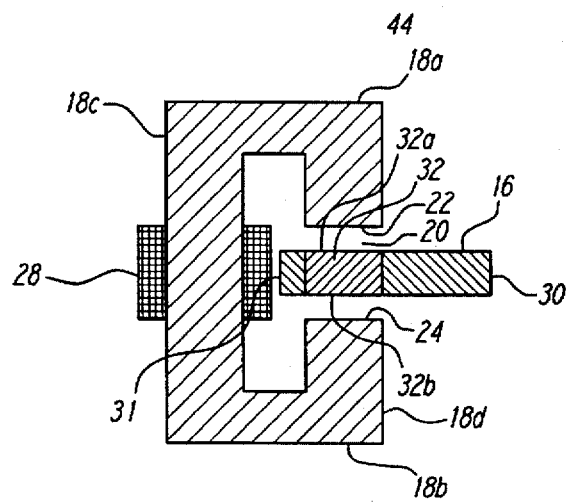
FIG. 2 is a cross-sectional view, as seen along the line 2—2 in FIG. 1.

Stated differently, each from side element 18d is formed with a top surface 22 and a bottom surface 24 (FIG. 2), and as can be appreciated in cross-reference to FIGS. 1 and 2 the front surfaces 22 together define a first planar ring. As can be further appreciated in reference to FIGS. 1 and 2, the bottom surfaces 24 together define a second planar ring, and the first and second planar rings are parallel, are of equal diameter, and are concentric (i.e., they share a common axis).

In the embodiment shown in FIG. 1, the open portion of the "C" defined by each stator member 18 is oriented outwardly. In other words, the rotor 16 surrounds the back side elements 18c of the stator members 18.

FIG. 1 additionally shows that in the presently preferred embodiment, each stator member 18 is established by a plurality of thin, flat, generally C-shaped stator elements 26, with each stator element 26 of a particular stator member 18 being held flush against its immediately adjacent stator elements 26. The stator elements 26 are made of a material which is characterized by high magnetic permeability, e.g., iron.

FIGS. 1 and 2 also show that an electrically conductive armature winding 28 is wrapped around a respective back side element 18c. It is to be understood that the armature windings 28 can be electrically connected in a predetermined manner, e.g., series, parallel, delta, etc. to provide an electrical output having the desired phases, currents, voltages, and waveforms. The number of turns per armature winding 28 and the nature of the interconnections from winding 28 to winding 28 may be established to accommodate the desired electrical output characteristics. It will be further understood that the stator elements 26 that establish a stator member 18 are held together by the armature windings 28 of the respective suitor member 18. Further, after the armature windings 28 are wound around the associated stator member 18, the stator member 18 can be shellaqued to further hold the stator elements 26 together.

In cross-reference to FIGS. 1 and 2, the rotor 16 is wheel-shaped, and is preferably thin, flat, and ring-shaped. Accordingly, the rotor 16 defines an outer periphery 30 and an inner periphery 31, and, as shown in FIGS. 1 and 2, a plurality of cylindrically-shaped permanent magnets 32 are mounted on the rotor 16 in a circular pattern generally on or near the outer periphery 30 of the rotor 16. Preferably, the magnets 32 are made of a suitable high-strength permanent magnetic material, such as rare earth cobalt or neodymium ferrite, while the rotor 16 is made of a lightweight material characterized by low magnetic permeability, e.g., hard plastic or aluminum.

Each permanent magnet 32 has a north pole face 32a (FIG. 2) and an opposed south pole face 32b, and the north pole faces 32a of the magnets 32 are oriented in the same direction as each other (i.e., upwardly in FIGS. 1 and 2). Likewise, the south pole faces 32b of the magnets 32 are oriented in the same direction as each other (i.e., downwardly in FIGS. 1 and 2).

As can be appreciated in reference to FIG. 1, the radius of the circle defined by the magnets 32 is established such that the magnets 32 pass between successive gaps 20 in the stator 14 when the rotor 16 is rotated with respect to the stator 14. As the skilled artisan will appreciate, when the rotor 16 is rotated to cause the magnets 32 to pass through the gaps 20 of the stator members 18, electricity is generated in the armature windings 28.

In the presently preferred embodiment, the magnets 32 are press-fit into receiving holes formed or machined in the rotor 16. As shown, each magnet 32 extends through the entire width of the rotor 16, as measured axially, though they may extend more or less than the width of the rotor 16. In the embodiment shown in FIG. 2, the north pole faces 32a and south pole faces 32b of the magnets 32 are flush with the surface of the rotor 16. The shape, size, number, material, and properties of the magnets 32 may vary depending on waveform and magnitude of electrical output desired, as well as other design considerations.

The rotor 16 may be rotatably mounted on the base 12 by any suitable means, including the means shown in FIG. 1. As shown, a plurality of bearing supports 34 are attached to or formed integrally with the base 12, and each bearing support rotatably supports a respective round or cylindrical bearing roller 36. In reference to FIG. 1, bearing rollers 36 are provided on top of and below the rotor 16 and abut the rotor 16 to support the rotor 16.

As the skilled artisan will appreciate, apart from the particular means used to support the rotor 16, the rotor 16 is shaftless, and is driven, as disclosed below, by urging against the rotor 16. Consequently, a mechanical advantage in turning the rotor 16 is gained vis-a-vis a shaft-driven rotor. As a further consequence of the shaftless design of the rotor 16, operability of the generator 10 is possible at relatively low rotor 16 rotational speeds. Moreover, the drag experienced in turning the rotor 16 may not appreciably increase with increasing rotational speeds. Additionally, any counter electromotive force (emf) generated by current in the armature windings 28 will tend to reduce power output, but will have little, if any, effect on the drag experienced in rotating the rotor 16. Furthermore, output voltage of the generator 10 tends to be relatively stable. Also, the generator 10 can effectively generate electricity at relatively low (e.g., 600 RPM) rotational speeds.

Still referring to FIG. 1, a rotor driver, generally designated 38 is operably coupled to the rotor to the rotor 16 to cause the rotor 16 to rotate. In one embodiment, the rotor driver 38 includes a plurality of vanes 40. Fluid can be directed against the vanes 40 to cause the rotor 16 to rotate. Accordingly, the rotor driver 40 can be a turbine or windmill. Alternatively, the base 12 can be mounted on a vehicle, and wind can urge against the vanes 40 to cause the rotor 16 to rotate. While FIG. 1 shows only three vanes 40, it is to be understood that many more vanes 40 can be attached to the rotor 16 around the entire length of the outer periphery 30 of the rotor 16.

As best shown in FIG. 2, the output voltage of the generator 10 can be controlled by varying a DC current in coils 44 which can be located anywhere on a respective one of the stator members 18. Alternatively, voltage may be controlled by a group of switches (not shown) connecting a variable number of winding 28 turns directly to output terminals. As yet another alternative, a rectifier (not shown) may be operably connected to the output of the generator 10 to control voltage. The DC current, opening and closing of the switches, or rectifier may be controlled using conventional voltage regulator methods and devices.

Figure 3:
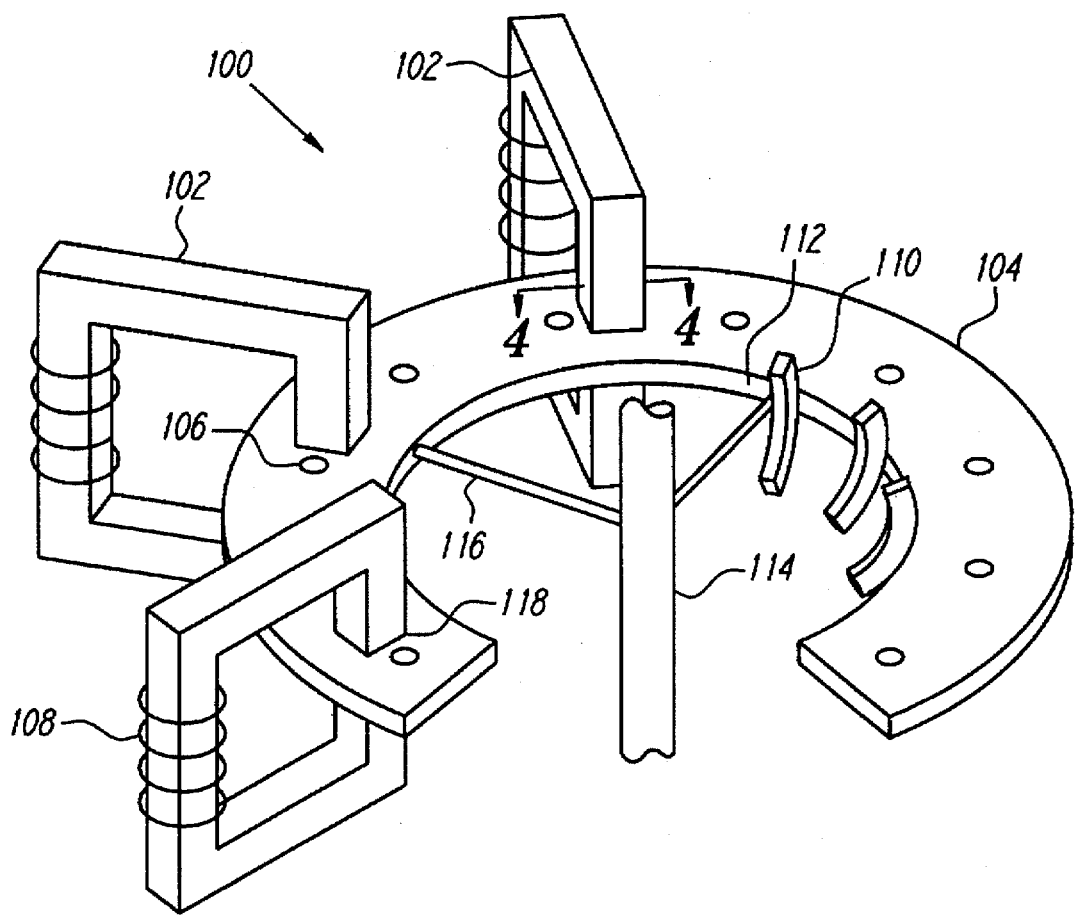
FIG. 3 is a perspective view of an alternate embodiment of the generator of the present invention, with portions broken away for clarity and with the vanes shown schematically.

FIG. 3 shows an alternate embodiment of the generator of the present invention, generally designated 100, which has a plurality of "C"-shaped stator members 102, a rotor 104, and a plurality of permanent magnets 106 mounted on the rotor 104. The generator 100 shown in FIG. 3 is substantially identical to the generator 10 shown in FIG. 1, except that the opening of the "C" established by each stator member 102 is oriented inwardly, i.e., the periphery of the rotor 104 is surrounded by the closed sides of the stator members 102. Consequently, cooling of stator-mounted armature windings 108 is facilitated.

Additionally, a plurality of vanes 110 are mounted on an inner periphery 112 of the rotor 104. Accordingly, fluid may be directed through the annular rotor 104 against the vanes 110 to cause the rotor 104 to rotate relative to the stator members 102, thereby generating electricity in the armature windings 108.

If desired, the rotor 104 may be connected to a central support 114 via connecting arms 116 for supporting the rotor 104. Unlike the drive shafts of conventional generators, however, the central support 114 does not impart torque to the rotor 104, but is merely used as one means for supporting the rotor 104. Other means of supporting the rotor 104 may be used in lieu of the central support 114. Thus, as intend by the present invention, the rotor 104 shown in FIG. 3, like the rotor 16 shown in FIG. 1, is a shaftless rotor in the sense that a rotor shaft is not required to permit operation of the generator 100.

Figure 4:
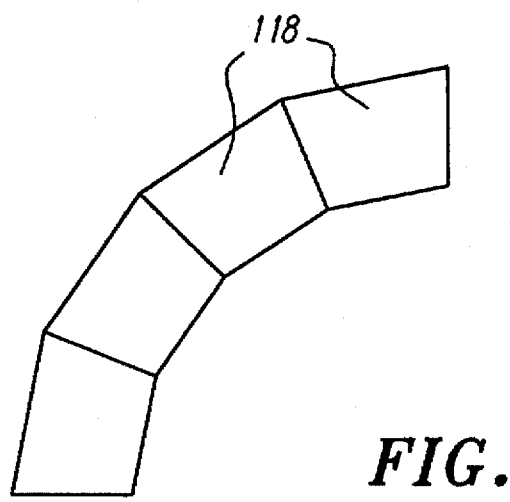
FIG. 4 is a cross-sectional view of the open ends of several stator members, as would be seen along the line 4—4 in FIG. 3.

FIG. 3 shows that each stator member 102 includes a top surface 118 which faces the rotor 104 and which is closely spaced from the rotor 104. Also, each stator member 102 includes a bottom surface that is opposed to the top surface (bottom surfaces not shown in FIG. 1). FIG. 3 shows that the top surfaces 118 of the stator members 102 are spaced apart from each other, but as shown in FIG. 4, the stator members 102 alternatively can be positioned close together around the rotor 104 with their top surfaces 118 contiguous with each other. In such an embodiment, the bottom surfaces of the stator members 102 would also be contiguous. Stated differently, in the embodiment shown in FIG. 4, the top surfaces 118 of the stator members 102 establish a first continuous ring-shaped surface, while the bottom surfaces of the stator members 102 establish a second continuous ring-shaped surface.

To facilitate positioning the stator members 102 closely together as shown in FIG. 4, the top surfaces 118 of the stator members 102 can be wedge-shaped. In other words, as shown in FIG. 4, the top surfaces 118 can be trapezoidal-shaped, with the long base of each trapezoid oriented outwardly and the short based positioned radially inwardly of the associated long base.

While the particular high-efficiency electric power generator as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. An electric power generator, comprising:

a stator including a plurality of stator members made of material characterized by high magnetic permeability, each stator member having a back side element wound with electrically conductive wire and opposed top and bottom elements connected to the back side element and extending perpendicularly away therefrom to establish a gap between the top and bottom elements;

a wheel-shaped shaftless rotor defining a periphery and having at least one permanent magnet mounted thereon, said rotor circumscribing a hollow circular region within which said stator members are at least partially positioned, wherein the rotor is rotatably mounted such that the magnet passes between successive gaps in the stator when the rotor is rotated with respect to the stator; and a rotor, driver coupled directly to the periphery of the rotor said rotor driver comprising at least one vane against which an external fluid force can be applied to cause the rotor to rotate.

2. The generator of claim 1, further comprising a plurality of permanent magnets mounted in a circular pattern on the rotor.

3. The generator of claim 2, wherein each stator member is generally C-shaped, and each stator member is made of a plurality of thin, flat, C-shaped stator elements, each stator element positioned flush against its immediately adjacent stator elements.

4. The generator of claim 3, wherein the stator members are electrically connected with each other in parallel.

5. The generator of claim 3, wherein the stator elements are electrically connected together in series.

6. The generator of claim 1, wherein the wheel-shaped rotor is thin, flat, and ring-shaped.

7. The generator of claim 6, further comprising a plurality of bearings juxtaposed with the rotor for supporting the rotor.

8. The generator of claim 1, wherein the vane is a turbine blade.

9. The generator of claim 1, wherein the vane is a windmill vane extending outward from the periphery of said rotor and the external fluid force is air moving relative to the generator.

10. The generator of claim 6, wherein the periphery of the rotor surrounds the back side elements of the stator members.

11. The generator of claim 1, wherein said rotor is rotatably mounted between a plurality of bearings connected to a base.

12. An apparatus for generating electricity, comprising:

a stator made of magnetically permeable material, the stator defining an annular gap;

an electrically conductive winding in electro-magnetic engagement with the stator;

a plurality of permanent magnets disposed adjacent the winding for generating a magnetic field, said plurality of permanent magnets mounted on a shaftless rotatable rotor movably disposed relative to the stator such that when the rotor is rotated relative to the stator an electric current is generated in the winding, said rotor having a flat shape and central opening defining an inner periphery surrounding said stator; and a rotor driver coupled directly to the periphery of the rotor, said rotor driver comprising at least one vane against which an external fluid force can be applied to cause the rotor to rotate.

13. The apparatus of claim 12, wherein the magnets are mounted on the rotor in a circular pattern such that the magnets pass through the gap of the stator when the rotor is rotated, and wherein the stator includes a plurality of stator members made of material characterized by high magnetic permeability, each stator member having a back side element wound with electrically conductive wire and opposed top and bottom elements connected to the back side element and extending perpendicularly away therefrom to establish the annular gap between the top and bottom elements.

14. The apparatus of claim 13, wherein each stator member is generally C-shaped, and each stator member is made of a plurality of thin, flat, C-shaped stator elements, each stator element positioned flush against its immediately adjacent stator elements.

15. The apparatus of claim 14, wherein the rotor is thin, flat, and ring-shaped.

16. The apparatus of claim 15, further comprising a plurality of bearings juxtaposed with the rotor for supporting the rotor.

17. The apparatus of claim 13, wherein said inner periphery defines a circular plane, and wherein each stator member is generally C-shaped, said stator members being disposed in a radial pattern with respect to the center of said circular plane such that the back side element of each stator member passes through said circular plane and the annular gap of each stator member surrounds said rotor.

18. The apparatus of claim 12, wherein said rotor is rotatably mounted between a plurality of bearings connected to a base.

19. A generator of electricity, comprising:

a magnetically permeable stator forming first and second planar rings of equal diameter and defining a central axis, the rings being generally parallel and axially spaced from each other to establish a gap therebetween:

at least one stator winding engaged with the stator;

a circularly-shaped shaftless rotor having alternating regions of magnetized and unmagnetized material, the rotor disposed for rotation about the central axis and around the stator, with the regions of magnetized and unmagnetized material disposed generally on the periphery of the rotor for movement within and through the gap to thereby induce an electrical current in the stator winding; and a rotor driver coupled directly to the periphery of the rotor, said rotor driver comprising at least one vane against which an external fluid force can be applied to cause the rotor to rotate.

20. The generator of claim 19, wherein the stator includes a plurality of stator members made of material characterized by high magnetic permeability, each stator member having a back side element wound with electrically conductive wire and opposed top and bottom elements connected to the back side element and extending perpendicularly away therefrom to establish the annular gap between the top and bottom elements.

21. The generator of claim 20, wherein each stator member is generally C-shaped, and each stator member is made of a plurality of thin, flat, C-shaped stator elements, each stator element positioned flush against its immediately adjacent stator elements.

22. The generator of claim 19, wherein the rotor is thin, flat, and ring-shaped.

23. The generator of claim 20, wherein the rotor defines an inner periphery, and the inner periphery of the rotor surrounds the back side elements of the stator members.

24. The generator of claim 19, wherein said rotor is rotatably mounted between a plurality of bearings connected to a base.

* * * * *